(No Model.) 2 Sheets—Sheet 1.
W. C. WILLIAMS.
POULTRY FATTENING MACHINE.
No. 406,248. Patented July 2, 1889.
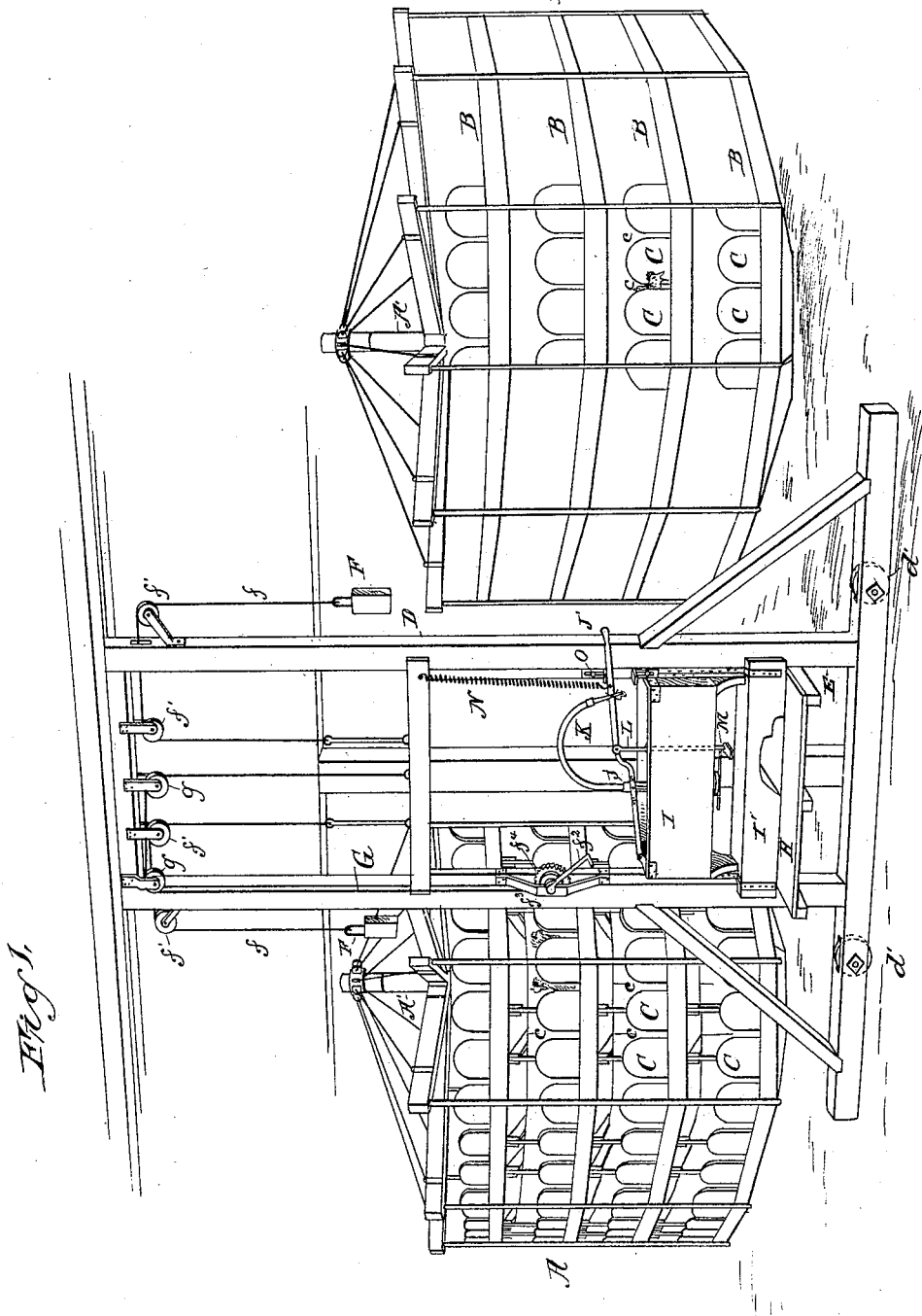
WITNESSES:
INVENTOR
William C. Williams
BY Frederick M Crocker
ATTORNEY

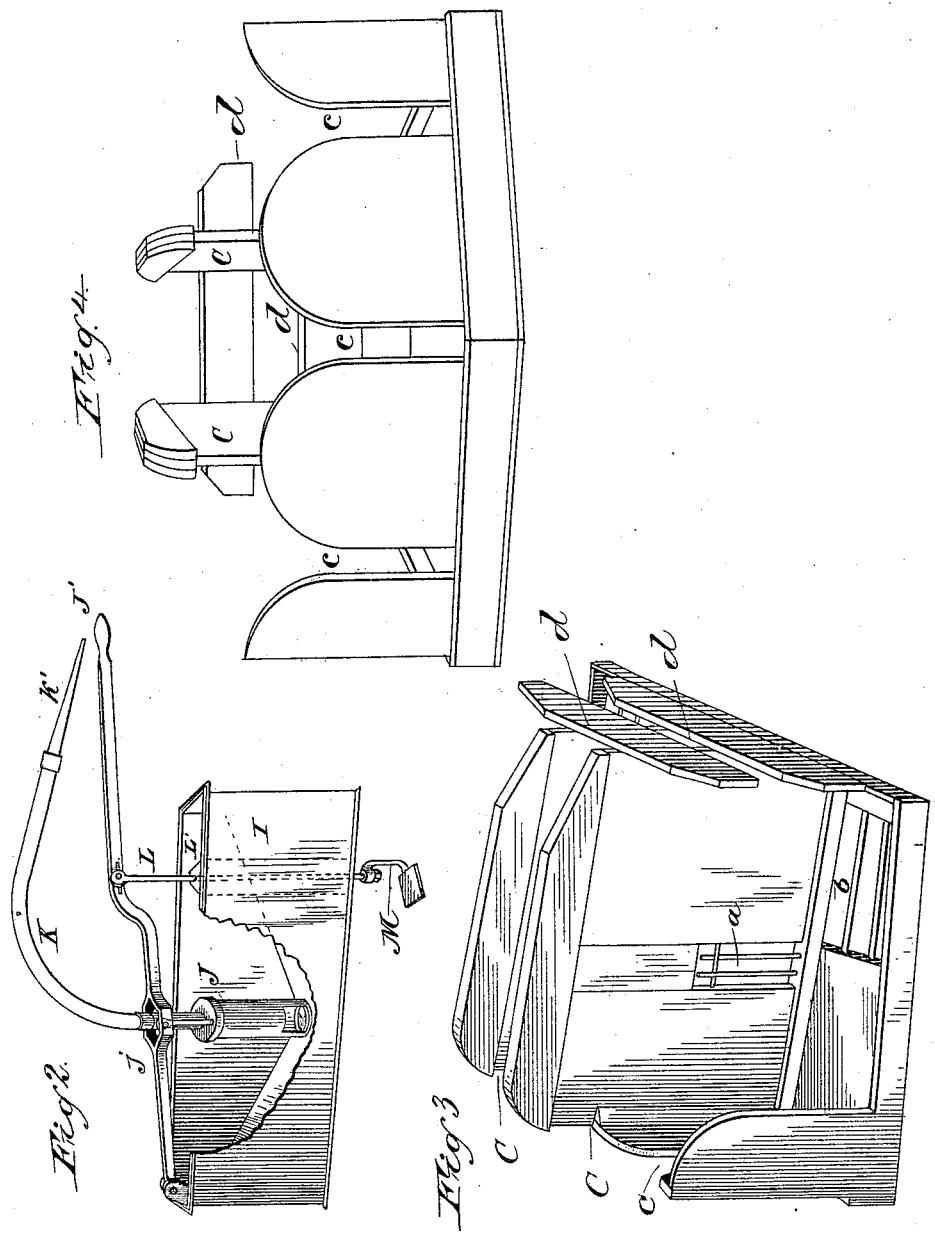

UNITED STATES PATENT OFFICE.

WILLIAM C. WILLIAMS, OF OLEAN, NEW YORK.

POULTRY-FATTENING MACHINE.

SPECIFICATION forming part of Letters Patent No. 406,248, dated July 2, 1889.

Application filed December 12, 1888. Serial No. 293,390. (No model.)

*To all whom it may concern:*

Be it known that I, WILLIAM C. WILLIAMS, a citizen of the United States, residing at Olean, Cattaraugus county, New York, have invented a certain new and useful Improvement in Poultry-Fattening Machines, of which the following is a specification.

My invention relates to a poultry-fattening machine consisting of a movable frame carrying an elevator upon which is placed a food-receptacle, the same being operated in conjunction with rotating coops, which are divided into boxes or compartments for containing the fowls to be fattened.

The object of my invention is to construct a machine which will enable the operator thereof to feed systematically a large number of fowls for the purpose of fattening them within the shortest possible time. This end I attain in the following manner: A food-receptacle is mounted upon an elevator placed within a transversely-movable frame which travels along tracks upon the floor and ceiling of the building in front of revolving coops. The elevator upon which the food-receptacle is placed is adjustable within the movable frame by means of weights and cords, and its motion is regulated by a pawl and ratchet under the control of the attendant. The food-receptacle is provided with a force-pump having attached thereto a tube, through which the food is forced in a specified amount into the crop of the fowl, said amount being regulated by a gage acting upon the handle or lever of the force-pump. The attendant, after having fed all the fowls in one row of the revolving coop, raises himself and the food-receptacle with the elevator to the next row of compartments, and so continues until all the fowls are fed.

In the accompanying drawings, which illustrate my invention, Figure 1 is a side elevation of my invention. Fig. 2 is a side view of the food-receptacle, partly broken away to show the force-pump. Fig. 3 is an interior sectional view of one of the compartments of the coop, and Fig. 4 is a front view of one of the compartments.

Similar letters of reference indicate similar parts throughout the several views.

The coop A is shown as polygonal in general contour, and is hollow in the center, (although any other convenient form might be employed, if desired.) A rod A' passes through the center of the coop and constitutes an axle, around which the coop may be revolved. The coop A is divided into rows or tiers B, each of which is subdivided into boxes C, composed of cages or compartments, of which three are shown in the drawings. Obviously, however, any convenient number may be employed. These compartments are each provided with slats $a$ in the sides of the partitions, to which the fowl is fastened by means of a strap or other device passing around its leg. In the bottom of each compartment or cage is an opening protected by slats $b$, by means of which the cage can be quickly and properly cleaned. The front of each compartment is provided with a slot $c$, large enough to permit the convenient handling of the fowl therethrough while being fed. The rear of each box C is protected by slats $d$, which also serve to strengthen the structure.

The perpendicular rectangular frame D is so arranged as to be horizontally adjustable by means of rollers $d'$, which run in tracks at the top and bottom of the room. An elevator E is arranged to slide up and down within the frame D by means of weights F, which are attached to the top bar of the elevator by means of ropes or cords $f$, which pass over pulleys $f'$ at the top of the frame D. The action of the weights F is governed by a lever $f^2$, attached to a drum $f^3$, secured to the side of the frame D and controlled by a pawl and ratchet $f^4$. From the drum passes a rope G over pulleys $g$ at the top of the frame and down to the center of the top bar of the elevator, where it is firmly secured.

The platform H of the elevator is of sufficient width to permit the attendant to stand thereon, and the food-receptacle I rests upon a raised foundation I' upon the platform H, at a convenient height for the attendant's use. The bottom of the food-receptacle I is inclined from each side to the center thereof, where a suitable suction or force pump J is situated, being operated by means of a lever J', which is secured to one end of the food-receptacle. From the top of the force-pump J extends a pipe $j$, to the end of which is attached a rubber or other flexible tube K, having a suitable mouth-piece K'. The lever J' is aided in its operation by means of a rod L, attached thereto and passing through a suitable sheath or casing L' in the inside of the feed-receptacle and through the bottom of said receptacle, the end of said rod being turned up or provided with a stirrup M for the foot of the attendant. The movable end of the lever J' is attached to the top of the elevator by means of a coiled spring N, which, when the foot of the attendant is removed from the stirrup M, causes the lever J' to rise. Secured to the side of the elevator is an adjustable gage O, which limits the downward movement of the lever J', thus regulating the amount of food to be injected into the crop of the fowl.

The mode of operation of my invention is as follows: The sliding frame D is placed before one of the revolving coops, and the attendant, standing upon the platform of the elevator, grasps a fowl with one hand and with the other places the mouth-piece K' of the flexible tube K within the mouth of the fowl, and by the pressure of his foot upon the stirrup M causes a certain amount of food to be injected into the crop of the fowl, said amount being regulated by the gage O, which limits the downward movement of the lever J'. It is of course obvious that the greater the downward movement of the lever J' the greater will be the pressure exerted by the force-pump upon the food in the receptacle, and vice versa, and consequently the attendant is enabled accurately to regulate the amount of food to be fed to each fowl. After the attendant has fed all the fowls in one row of a coop, which he can do without changing his position on the elevator, the coop being easily revolved by hand, he raises the elevator, upon which he and the food-receptacle stand, to the next row in the coop by means of the lever $f^2$, controlled by the pawl and ratchet $f^4$, and feeds the fowls in this row, as before. This operation is repeated until all the fowls in the coop are fed. The frame D is then moved along the tracks to the next coop, where the same operation is repeated, and so on through the entire number of coops employed.

Obviously the size and height of the structure embodying my invention can be varied to conform to the size of the building in which it is situated.

By the use of my invention a large number of fowls can be fed daily in an easy, efficient, and convenient manner and within the shortest possible time, and, furthermore, fowls fattened by this device are found to furnish a very superior quality of meat, commanding the highest price in the market.

What I claim as my invention is—

A poultry-feeding apparatus consisting, essentially, of a horizontally-sliding frame, a food-receptacle arranged in said frame, means for elevating said food-receptacle, and a series of pivotal coops, as and for the purpose described.

WILLIAM C. WILLIAMS.

Witnesses:
JASPER E. SMITH,
WILLIAM V. SMITH.